United States Patent
Xu et al.

(10) Patent No.: US 7,260,689 B1
(45) Date of Patent: Aug. 21, 2007

(54) METHODS AND APPARATUS FOR DETECTING USE OF COMMON RESOURCES

(75) Inventors: Yongmei Xu, Westford, MA (US); Serge Marokhovsky, Upton, MA (US); Christopher A. Chaulk, Franklin, MA (US); Anuradha Shivnath, Southborough, MA (US)

(73) Assignee: EMC Corporation, Hopkinton, MA (US)

( * ) Notice: Subject to any disclaimer, the term of this patent is extended or adjusted under 35 U.S.C. 154(b) by 367 days.

(21) Appl. No.: 10/954,915

(22) Filed: Sep. 30, 2004

(51) Int. Cl.
    *G06F 12/00* (2006.01)
    *G06F 13/00* (2006.01)
    *G06F 13/28* (2006.01)

(52) U.S. Cl. .................................... 711/147
(58) Field of Classification Search ................. 711/147
     See application file for complete search history.

(56) References Cited

U.S. PATENT DOCUMENTS 6,839,746 B1 * 1/2005 Muthiyan et al. ........... 709/220

2003/0130821 A1 * 7/2003 Anslow et al. ............. 702/186
2004/0102925 A1 * 5/2004 Giffords ..................... 702/182
2005/0086554 A1 * 4/2005 Simes ........................... 714/4
2005/0091353 A1 * 4/2005 Gopisetty et al. ........... 709/223

* cited by examiner

*Primary Examiner*—Matthew Kim
*Assistant Examiner*—Edward J Dudek
(74) *Attorney, Agent, or Firm*—Chapin IP Law, LLC; Barry E. Chapin, Esq.

(57) ABSTRACT

Historical access information identifies which resources in a storage area network access portions of shared storage in the storage area network. Based on an analysis of the historical access information, a management report generator application analyzing such information can infer the existence of a cluster of resources that access a common portion of shared storage. When the management report generator identifies that two or more resources access the same storage resources during approximately the same timeframe, the management report generator knows that there is a high likelihood that the two or more resources are part of a cluster sharing access to common storage resources. Thus, when reporting a tally of storage resources used in the storage area network, it is possible for the management report generator to take into account the cluster and indicate that two resources share access to a common portion of storage.

30 Claims, 9 Drawing Sheets

METHODS AND APPARATUS FOR DETECTING USE OF COMMON RESOURCES

BACKGROUND

The rapid expansion of information service and data processing industries has resulted in a need for computer systems to manage and store large amounts of data. As an example, financial service companies such as banks, mutual fund companies or the like often operate complex data processing systems that require access to many hundreds of gigabytes or even terabytes of data and files stored in high capacity data storage systems. Data storage system developers have responded to these types of data storage requirements by integrating computer systems, switch fabrics, and large capacity data storage systems into networks called "storage networks" or "storage area networks" (SANs.)

In general, a storage area network is a collection of data storage systems (e.g., multiple disks) that are networked via a switching fabric to a number of host computer systems that operate as servers. For example, host computers of the storage area network couple to and access the storage systems of the storage area network through a switch fabric. Consequently, the host computers access data stored in the data storage systems on behalf of client computers that request data from the host computers. Typically, storage area networks support hi-speed acquisitions of data so that the host servers are able to promptly access storage resources in the storage area network for their corresponding clients.

Conventional storage area network management applications provide conventional graphical user interfaces (GUIs) enabling network managers to graphically manage, control and configure various types of hardware and software resources associated with a corresponding managed storage area network. For example, one conventional network management storage application enables a network manager at a computer associated with the storage area network to request reports of how much data storage resources of the storage area network are used by respective resources in the storage area network. Based on this information, the network manager can decide, among other things, how to allocate storage resources and determine at what point it is necessary to increase storage capacity of the storage area network.

SUMMARY

Conventional network management applications that support generation of storage usage reports suffer from a variety of deficiencies. For example, certain conventional network management applications enable a network manager to request and view management reports associated with a storage area network. The management reports typically include information pertaining to resources in the storage area network and corresponding storage used by those resources. However, conventional applications do not provide any indication whether multiple resources in the storage area network are part of a cluster of resources having access to common portions of shared storage. Consequently, reports generated by such conventional applications may erroneously indicate that a total present usage of storage resources in the storage area network is greater than an amount of storage resources actually used in the storage area network. For example, a conventional report may indicate that resource A in the storage area network utilizes 100 MB (Mega Bytes) of storage resources while resource B also utilizes 100 MB of storage resources in the storage area network. Without knowledge that resource A and resource B share access to the same 100 MB of storage resource, a report may erroneously indicate that 200 MB of storage resources are used in the storage area network while in actuality only 100 MB are used. A network manager may therefore opt to increase storage capacity of the storage area network when it is not necessary to do so.

Embodiments of the invention significantly overcome the aforementioned and other deficiencies of conventional network management applications. In particular, embodiments of the invention include mechanisms and techniques for managing network resources in such a way as to infer the existence of a cluster of resources (e.g., multiple computers) that access common portions of shared storage in a storage area network without direct communications with members of the cluster.

For example, in contradistinction to conventional techniques, embodiments of the invention include a technique of collecting historical access information associated with resources in a storage area network. The historical access information identifies which resources in the storage area network access portions of shared storage in the storage area network. Based on an analysis of the historical access information, a management report generator application can infer the existence of a cluster of resources that access a common portion of shared storage. That is, when management report generator identifies that two or more resources access the same storage resources during approximately the same timeframe, there is a high likelihood that the two or more resources are part of a cluster of resources that compete or share access to the same storage resources. Thus, when reporting a tally of storage resources used in the storage area network, it is possible to take into account the cluster and indicate that two resources share access to a common portion of storage.

More specifically, an embodiment of the invention includes a computer process that searches a repository of data (e.g., a database of information) including identification of respective resources in a storage area network and a corresponding time when the respective resources access regions of shared storage in the storage area network. The repository of data is derived from messages received from software agents operating at different locations of the storage area network. For example, agents in host resources, switch resources and storage resources of the storage area network generate access information that is transmitted to and stored in the repository via use of agents.

Based on contents of the repository, the computer process parses data to produce data sets of information associated with specific resources in the storage area network. In one embodiment, the computer process generates data sets as information in XML (Extensible Markup Language) files, each of which maintains i) information regarding particular resources (e.g., applications, volumes, etc.) and ii) corresponding data accesses performed by the particular resource.

In one embodiment, a management report generator utilizes the data sets of historical access information to generate reports for users as briefly discussed above. For example, in one embodiment, the management report generator receives a request for a data access report based on selected one or more resources in the storage area network. The management report generator retrieves pertinent data sets associated with the selected resources to create or generate the data access report. After generating the report, the management report generator serves and displays the data access report for viewing by a user generating the request.

As discussed, one purpose for producing the data access report is to provide an indication whether the selected resources in the storage area network share access to common regions of storage in the storage area network.

Accordingly, an embodiment of the invention is directed to retrieving i) a first data set of historical data access information identifying regions of shared storage accessed by the first resource, and ii) a second data set of historical data access information identifying regions of shared storage accessed by the second resource. The management report generator reviews access logs (i.e., retrieved data sets) associated with the first resource and the second resource to identify specific regions of the shared storage and a corresponding time when the first resource and the second resource access the specific regions. Based on analyzing contents (e.g., access logs) of the first data set and the second data set, the management report generator infers existence of a cluster of resources having access to a common portion of shared storage.

Inferring existence of a cluster of resources may include identifying that the first resource and second resource share access to an entire volume group created on multiple storage disks. For example, suppose that a user creates a volume group based on storage from three disks and only two of the disks are shared with another host resource. In such a case, certain embodiments of the invention do not infer the existence of a cluster because the volume group is not completely shared amongst the host resources.

In one embodiment, the management report generator can confirm the existence of an "inferred" cluster of resources based on direct communications. For example, the management report generator (or related management application) generates a query directly to the particular resource presumed to be part of a cluster or a cluster manager application associated with particular the resource. Based on a reply by the particular resource or cluster manager application to a received query, the management report generator (or related management application) confirms that the resource is part of the cluster of resources having access to the common portion of shared storage.

Accordingly, an embodiment of the invention involves presuming existence of a cluster prior to any direct communications with particular resources that would indicate that such resources are part of a cluster, which coordinate amongst each other to access the common portion of the shared storage in the storage area network. Based on knowing or presuming the cluster exists, the report can indicate regions of shared storage that are used by multiple resources and avoid providing an erroneous indication of how much storage resources are currently used. For example, without an accounting for the existence of the cluster, the management report generator might otherwise erroneously conclude that resource A in the storage area network uses 60 MB of storage while resource B uses 60 MB of storage totaling 120 MB of usage overall. As discussed above, reporting that a combination of resources A and B consume 120 MB can be misleading to a network manager when in reality only 60 MB are shared by the resources. However, with an accounting (based on inferring existence of a cluster) that resource A and resource B access a common 60 MB of storage resource, the management report generator can generate a more accurate report identifying that total usage by the resource A and resource B is 60 MB and that they share use of the same storage regions in the storage area network. The report can also explicitly identify which resources are part of a corresponding cluster in a storage area network.

In a further embodiment, as a result of inferring the existence of the cluster of resources, the management report generator provides a notification of the existence of the cluster to a resource manager application that generates a managed object database (e.g., the repository as discussed above) associated with resources in the storage area network. Receipt of the notification by the resource manager application prompts the resource manager application to generate a cluster object including information associated with the "inferred" cluster of resources in the storage area network.

In one embodiment, the resource manager enables users to view cluster resources in the storage area network based on retrieval of the cluster object (produced as a result of inferring existence of the cluster) from the managed object database. For example, the resource manager application displays a hierarchy of resources associated with the storage area network. At least one of the icons in the hierarchy of icons corresponds to the cluster object (in the hierarchy) that, when selected, displays a corresponding "inferred" cluster of resources (e.g., two or cluster member resources) having access to the common portion of shared storage. Inferring that a cluster exists based on the techniques herein is simpler than explicitly polling every resource in a storage area network to determine whether the resource is a part of a storage area network.

As discussed, techniques of the invention are well suited for use in applications in which a software management application searches information in a database to deduce the existence of a cluster of resources in a storage area network. However, it should be noted that embodiments of the invention are not limited to use in such applications and thus embodiments of the invention are well suited for other applications as well.

As mentioned above, a cluster of resources may include more than two members resources. For example, the cluster may include a third resource, fourth resource, etc., all of which access common portions of shared storage. To identify potential third, fourth, etc. members in a cluster, the management report generator, in addition to retrieving the first and second data sets, also retrieves respective third, fourth, etc. data sets for comparison to identify member resources in a cluster.

Other embodiments of the invention include a computerized device (e.g., a host computer, workstation, etc.) configured to support the aforementioned method operations disclosed herein as embodiments of the invention to infer existence of clusters. In such embodiments, the computerized device includes a memory system, a processor (e.g., a processing device) and an interconnect. The interconnect supports communications among the processor and the memory system. The memory system is encoded with a software management application that, when executed on the processor, produces a management process capable of searching through data access information and determining whether a cluster exists in a storage area network.

Yet other embodiments of the invention disclosed herein include software programs to perform the method embodiment and operations summarized above and disclosed in detail below under the heading Detailed Description of Preferred Embodiments. More particularly, a computer program product (e.g., a computer-readable medium) including computer program logic encoded thereon may be executed on a computerized device to support identifying existence of a shared use of resources as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention.

One more particular embodiment of the invention is directed to a computer program product that includes a computer readable medium having instructions stored thereon for supporting management of network resources. The instructions, when carried out by a processor of a respective computer device, cause the processor to perform the steps of: i) retrieving a first data set including historical data access information associated with a first resource in the storage area network, the historical data access information in the first data set identifying regions of shared storage accessed by the first resource, ii) retrieving a second data set including historical data access information associated with a second resource in the storage area network, the historical data access information in the second data set identifying regions of shared storage accessed by the second resource, iii) comparing the first data set and the second data set to identify a common portion of shared storage accessed by both the first resource and the second resource, and iv) based on the comparing, inferring existence of a cluster of resources including at least the first resource and the second resource in the storage area network, the cluster of resources having access to the common portion of shared storage. It should be noted that a cluster of resources may include more than two members resources. For example, the cluster may include a third resource, fourth resource, etc., all of which access common portions of shared storage. In such circumstances, a management report generator, in addition to retrieving the first and second data sets, also retrieves respective third, fourth, etc. data sets for comparison to identify member resources in a cluster. Other embodiments of the invention include software programs to perform any of the method embodiment steps and operations summarized above and disclosed in detail below.

It should be understood that the system of the invention can be embodied as a software program or as a software program operating in conjunction with corresponding hardware. Example embodiments of the invention may be implemented within EMC's Control Center (ECC) software application that provides graphical management functionality for storage area network resources and in computerized devices that operate the Control Center (ECC) software. Control Center software is manufactured by EMC Corporation of Hopkinton, Mass., USA.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION OF PREFERRED EMBODIMENTS

An embodiment of the invention is directed to a technique of creating usage reports associated with a storage area network. Historical access information identifies which resources in a storage area network access portions of shared storage in the storage area network. Based on an analysis of the historical access information, a software process analyzing such information can infer the existence of a cluster of resources that access a common portion of shared storage. That is, when two or more resources access the same storage resources during approximately the same timeframe, the software process identifies that there is a high likelihood that the two or more resources are part of a cluster of resources that share and potentially compete for access to the same storage resources in a storage area network. Thus, when reporting a tally of storage resources used in the storage area network, it is possible for the software process to take into account the cluster and indicate that two resources share access to a common portion of storage.

One purpose of analyzing historical data access information associated with multiple resources is to identify which resources in a storage area network are associated with a cluster and, based on such information, prepare more accurate management reports of data storage usage. As discussed, conventional reports may erroneously indicate that a total usage of storage resources is greater than an amount actually used in the system. In contradistinction, a network manager using reports according to embodiments of the invention may therefore more accurately determine when to increase storage capacity of the storage area network. Inferring that a cluster exists based on the techniques herein is simpler than explicitly polling every resource in a storage area network to determine whether the resource is a part of a cluster in the storage area network.

Figure 1:
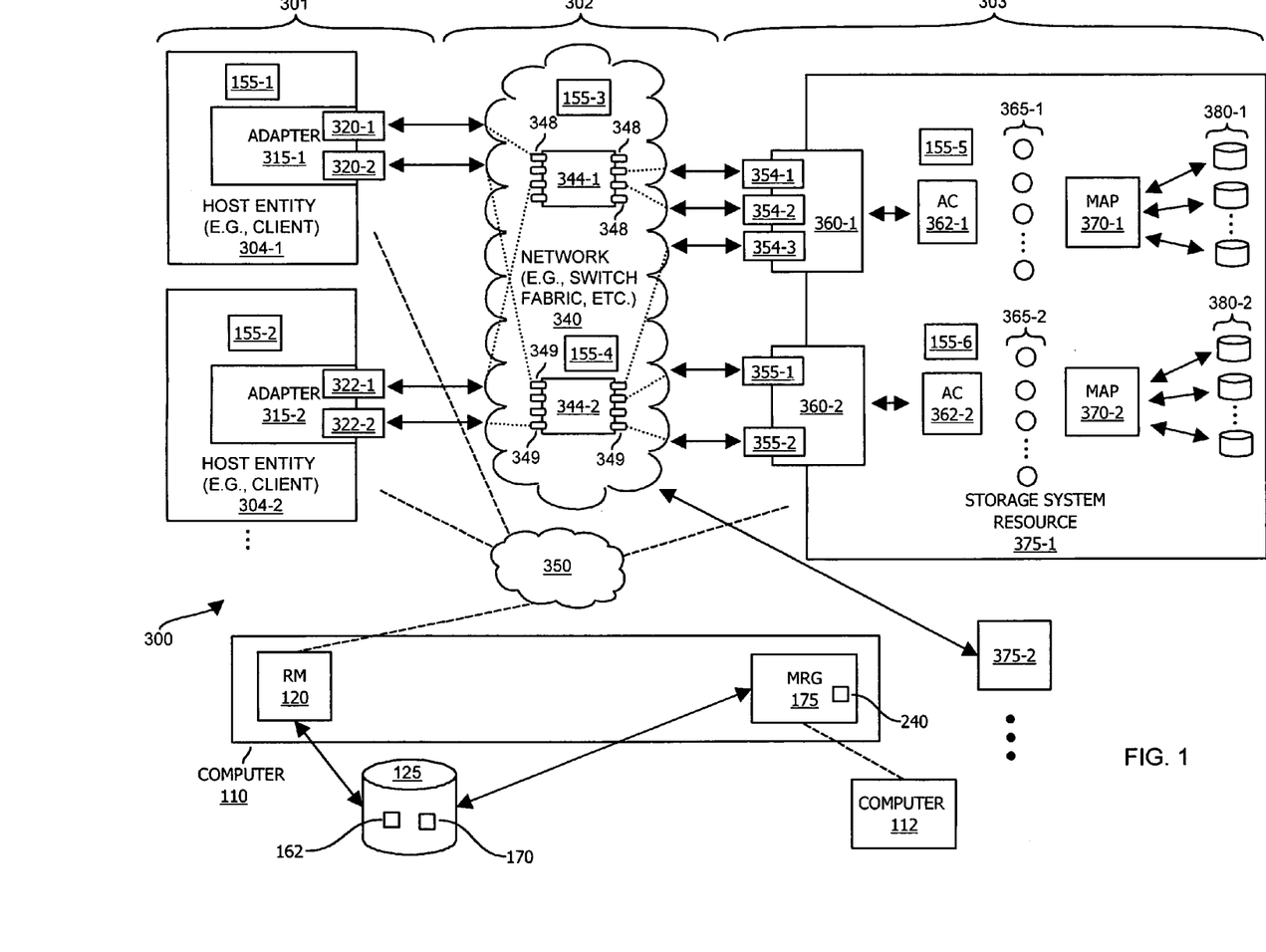
FIG. 1 is a block diagram illustrating a relationship between host resources, switch resources, and storage resources as well as an implementation of a cluster detection function according to an embodiment of the invention.

FIG. 1 is a block diagram illustrating connectivity of network resources (e.g., host resources 301, switch resources 302, and storage resources 303) in a storage area network 300 according to an embodiment of the invention. As shown, storage area network 300 includes host entity 304-1 and host entity 304-2 (collectively, host entities 304), network 340 (e.g., a high speed fiber based switch fabric), network 350 (e.g., LAN, WAN, Internet, intranet, etc.), storage system resource 375-1, storage system resource 375-2, computer system 110, and database 125. Network 340 includes switch device 344-1, switch device 344-2 and corresponding switch ports 348 and 349. Host entity 304-1 includes adapter 315-1 (e.g., host bus adapter) and corresponding port 320-1 and port 320-2 to communicate over network 340. Host entity 304-2 includes adapter 315-2 and corresponding port 322-1 and port 322-2 to communicate over network 340. Storage system resource 375-1 includes respective adapters 360-1 and 360-2, corresponding ports 354-1, 354-2, 354-3, 355-1 and 355-2, access controllers 362-1 and 362-2, storage devices 365-1 and 365-2, maps 370-1 and 370-2, as well as physical storage devices 380-1 and 380-2.

In one embodiment, storage area network 300 includes a network 340 (e.g., switching fabric) such as a high-speed data communications medium (e.g., Ethernet, optical network, or other type of network) that interconnects a plurality of components such as host entities 304 to storage system resources 375.

In general, storage area network 300 enables clients coupled to host entities 304 (e.g., clients, host computers, etc.) to access data in storage system resources 375. For example, clients generate and transmit requests for data to host entities 304. The host entities 304 in turn access data from storage system resources 375. Thus, in one embodiment, host entities 304 act as servers on behalf of clients generating the requests.

As more particularly shown, host entity 304-1 couples to network 340 via adapter 315-1 and corresponding ports 320. Ports 320 couple to respective ports 348 and 349 on switch devices 344. In turn, ports 348 and 349 of switch devices 344 (e.g., switch device 344-1 and switch device 344-2) couple to ports 354 and 355 of corresponding storage system resources 375. Thus, switch devices 344 and corresponding ports 348 and 349 form at least part of a connection path between host entities 304 and corresponding storage system resources 375. During a data access, data can travel either way along paths to and from host entities 304.

Storage system resource 375-1 includes access controllers 362 to facilitate access to corresponding storage devices 365 (e.g., logical storage space). Storage devices 365 are configured as logical portions of one or more physical storage devices 380 (e.g., arrays of storage disks). Volumes in storage area network 300 typically include one or more storage devices 365. Maps 370 provide a mapping of storage devices 365 (e.g., logical volumes) to corresponding physical storage devices 380 (e.g., storage disks).

In one embodiment, each host entity 304 is limited to accessing certain storage devices 365 in storage system resource 375-1 based at least in part on configuration settings of switch devices 344 of network 340. For example, in one embodiment, switch ports 348 and 349 of switches 344 are assigned to create zones in network 300. In general, a zone defines a group of resources in the network providing a logical path between a host resource and a storage array resource.

Storage area network 300 also includes computer 110 (e.g. a host computer) coupled to network 350 for collecting information associated with storage area network 300. In one embodiment, computer 110 also couples to network 340 similar to host entities 304. Agents 155 (e.g., agent 155-1, agent 155-2, agent 155-3, . . . , agent 155-6) distributed throughout storage area network 300 gather data such as data access information identifying times in which resources (e.g., applications, volumes, volume groups, etc.) in the storage area network 300 access devices 365 in storage system 375. For example, agent 155-1 monitors data accesses by resources in host entity 304-1, agent 155-2 monitors data accesses by host entity 304-2, agent 155-3 monitors data accesses by resources in switch entity 344-1, etc.

In addition to monitoring data accesses, agents 155 can be employed to collect, on behalf of resource manager 120, other types of system information as well. Based on collection of information from the agents 155, the resource manager 120 creates objects for storage in database 125. Thus, resource manager 120 includes a "store" process for storing information associated with storage area network 300.

In one embodiment, computer system 110 extracts information from database 125 using SQL (Structured Query Language) and stores the information in data structures for processing. For example, database 125 contains managed objects 162 (e.g., database records, tables, data structures, etc.) associated with various hardware and software entities associated with the storage area network 300.

Computer 110 can include a monitor to display information (e.g., a hierarchy of resources) associated with storage area network 300 to network administrators. The network administrators (e.g., network management personnel) select from the hierarchy to view different aspects of the storage area network 300. For example, a user selects a resource for viewing and the resource manager 120 utilizes objects stored in the database 125 to create and display an appropriate image on the display.

Collection of data can occur over a period of time such that database 125 stores historical information in managed objects 162.

As its name suggests, management report generator 175 in computer 110 generates reports. Management report generator 175 generates the reports based on data sets 170 of historical data access information. As discussed, the historical data access information reflects previous data accesses in storage area network 300. Management report generator 175 employs a cluster detection function 240 to identify which resources (e.g., applications, volumes, volume groups, file systems) in the storage area network 300 access the same regions of shared storage.

Figure 2:
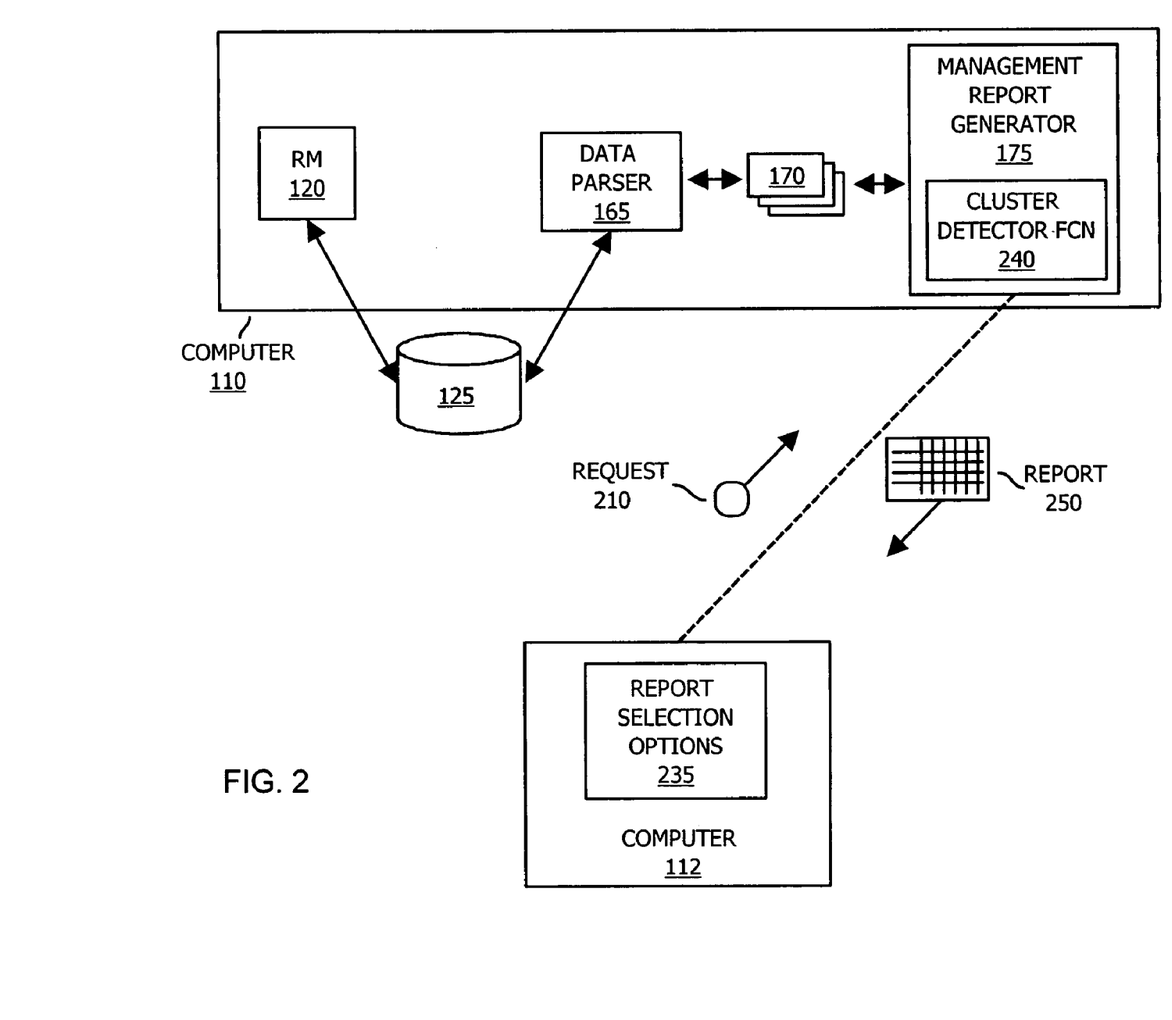
FIG. 2 is a diagram of a management report generator according to an embodiment of the invention.

FIG. 2 is a diagram more particularly illustrating a technique of generating a report 250 according to an embodiment of the invention. As shown, computer 112 displays report selection options 235 (e.g., a display of options for selecting a report format) to a corresponding user. The user of computer 112 then generates and transmits a report request 210 to management report generator 175. In turn, management report generator 175 utilizes data sets 170 to generate and transmit a requested report 250 back to computer 112 for viewing by the requester.

In the example embodiment shown, computer 110 includes a data parser 165 that retrieves data from database 125 to produce data sets 170 (e.g., XML files). The data sets 170 include historical data access information identifying specific regions of shared storage in storage area network 300 accessed by different resources in the storage area network 300.

As discussed above, management report generator 175 employs cluster detection function 240 to analyze data sets 170 and identify common portions of shared storage accessed by multiple resources (e.g., more than two resources) in storage area network 300. Based on analysis, management report generator 175 infers an existence of clusters of resources having access to common portions of storage in storage area network 300.

Functionality supported by computer 110, computer 112, and storage area network 300 according to embodiments of the invention will now be discussed with respect to flowchart 390 in FIG. 3 as briefly discussed above with respect to FIGS. 1 and 2.

Figure 3:
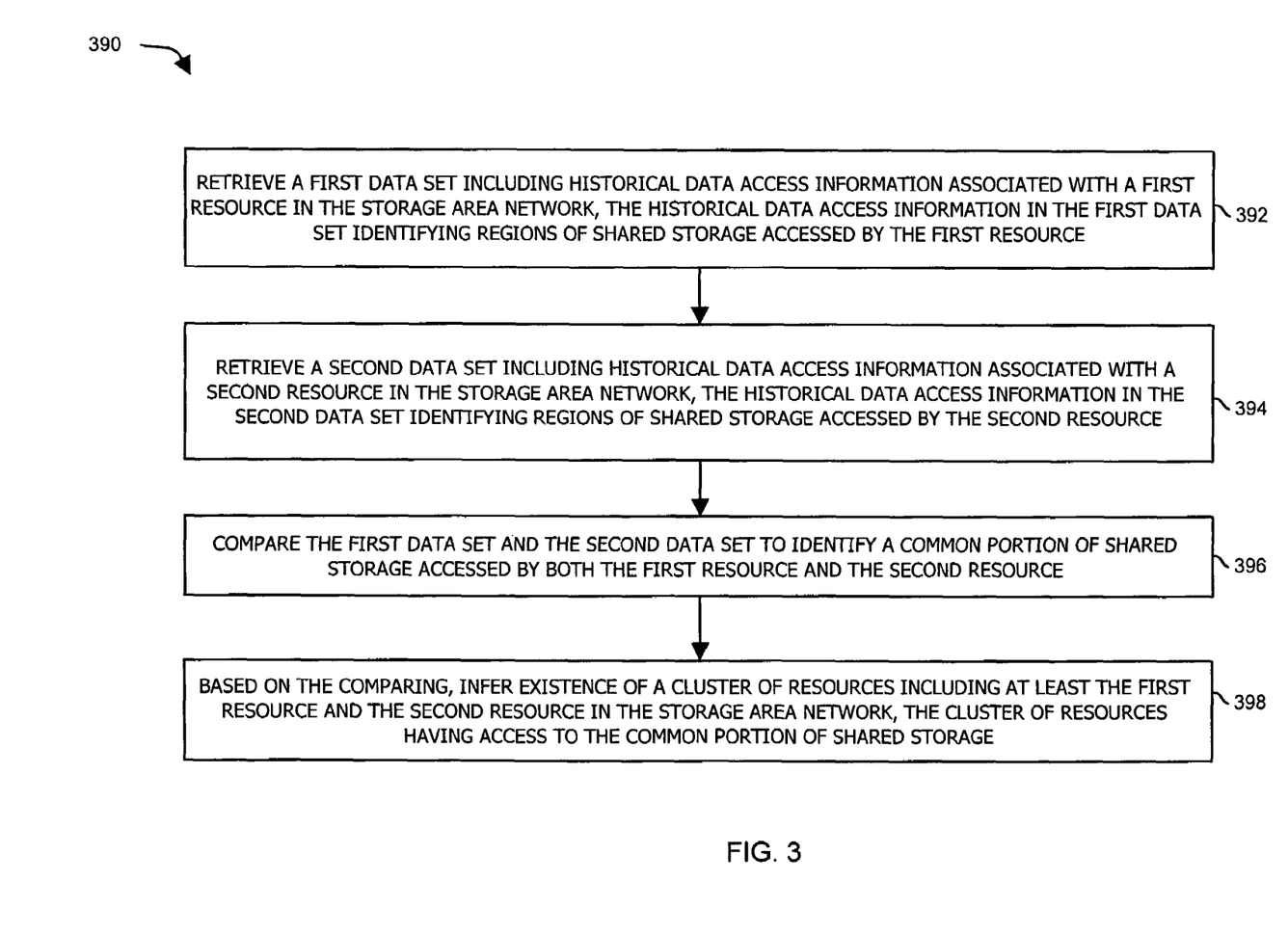
FIG. 3 is flowchart illustrating a technique of inferring existence of a cluster of resources according to an embodiment of the invention.

FIG. 3 is a flowchart 390 of processing steps performed by management report generator 175 according to an embodiment of the invention. In general, flowchart 390 illustrates a technique of generating reports 250. Note that the discussion of FIG. 3 will include occasional references to techniques and features discussed in the previous figures.

In step 392, based on receipt of the report request 210, the management report generator 175 retrieves a first data set 170 including historical data access information associated with a first resource (e.g., a first application running on host entity 304-1) in the storage area network 300. The historical data access information in the first data set 170 identifies regions of shared storage accessed by the first resource.

In step 394, the management report generator 175 retrieves a second data set 170 including historical data access information associated with a second resource (e.g., a second application running on host entity 304-2) in the storage area network 300. Similar to the first data set 170, the historical data access information in the second data set 170 identifies regions of shared storage accessed by the second resource.

In step 396, the management report generator 175, via use of cluster detector function 240, compares the first data set 170 and the second data set 170 to identify a common portion of shared storage accessed by both the first resource and the second resource.

In step 398, based on the comparing, the management report generator 175 infers existence of a cluster of resources including at least the first resource and the second resource in the storage area network. That is, the management report generator 175 infers, based on supporting information in the data sets 170, that both the first resource and the second resource of storage area network 300 access common portions of shared storage.

In one embodiment, inferring existence of a cluster of resources by management report generator 175 includes identifying that the first resource and second resource share access to an entire volume group created on multiple storage disks. For example, suppose that a user creates a volume group based on storage from three disks and only two of the disks are shared with another host resource. More specifically, suppose that a first host resource has access to the whole (e.g., all of the three disks) volume group and a second host resource has access only to part (e.g., two of the three disks) of the volume group. In such a case, the management report generator 175 does not infer the existence of a cluster including the first host resource and second host resource because the volume group is not completely shared amongst both host resources.

A cluster of resources may include more than two members resources. For example, a cluster may include a third resource, fourth resource, etc., all of which access common portions of shared storage. To identify potential third, fourth, etc. members in a cluster, the management report generator, in addition to retrieving the first and second data sets, also retrieves respective third, fourth, etc. data sets for comparison to identify whether corresponding resources access common portions of shared storage and, therefore, are part of a cluster.

When management report generator 175 identifies that two or more resources access the same storage resources in storage area network 300 during approximately the same timeframe, the management report generator 175 knows there is a high likelihood that the two or more resources in storage area network 300 are part of a cluster of resources that compete for or share access to the same storage resources. An example of a cluster of resources is an Oracle™ application running on each of respective computer entities 304-1 and 304-2, in which both entities access a common portion of shared storage devices 365. Thus, when reporting a tally of storage resources used in the storage area network 300, use of cluster detection function 240 makes it possible for management report generator 175 to take into account existence of the cluster and indicate that the two resources share access to a common portion of storage in storage area network 300.

Figure 4:
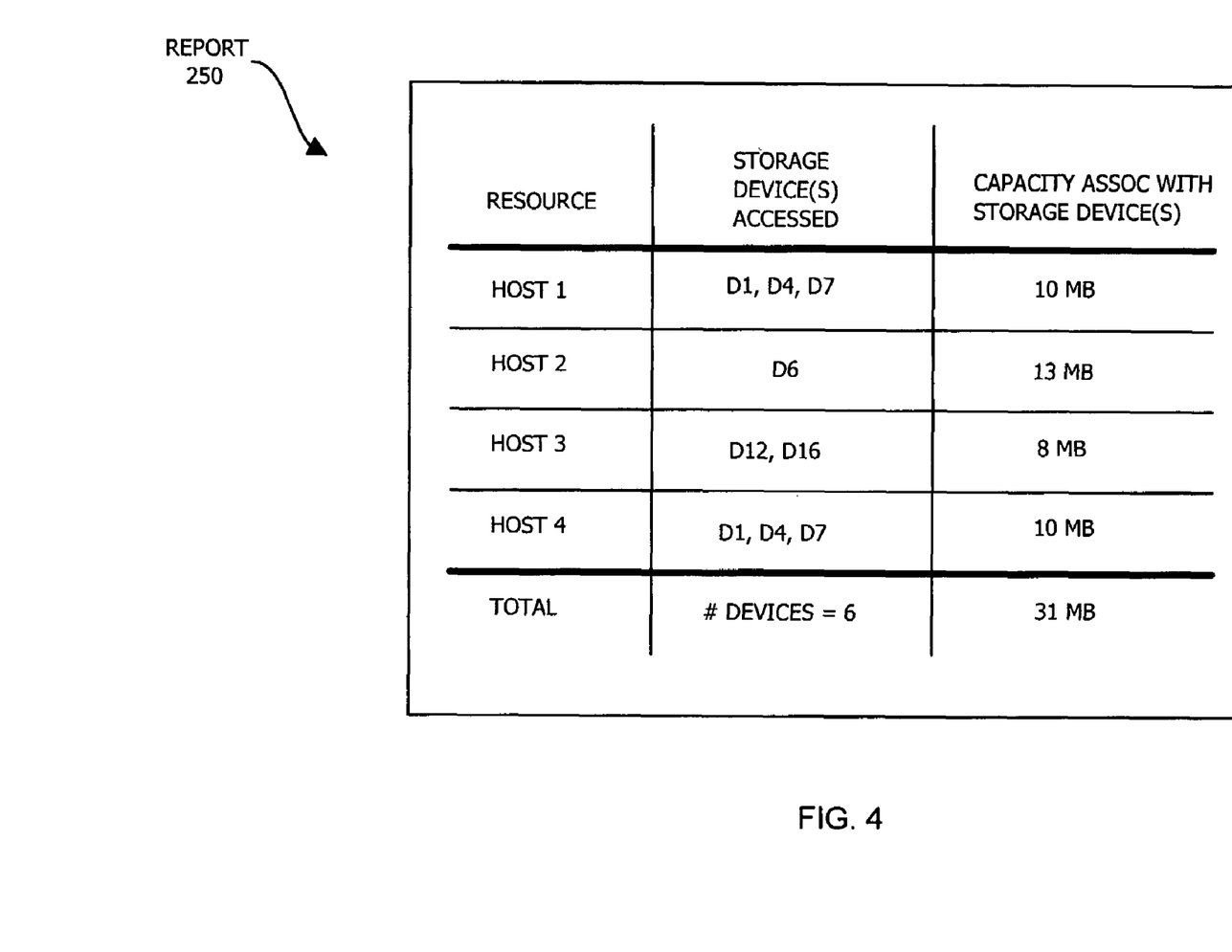
FIG. 4 is a diagram of an example management report according to an embodiment of the invention.

FIG. 4 is a diagram illustrating generation of a report according to an embodiment of the invention. As shown, a total available storage associated with host 1, host 2, host 3, and host 4 of storage area network 300 is 31 MB. Without detection of a cluster including host 1 and host 4, and a corresponding accounting that host 1 and host 4 access the same storage devices 365 (e.g. D1, D4, and D7), the report 250 would erroneously indicate that total storage used by hosts 1, 2, 3 and 4 is 41 MB, which is a total capacity of all storage devices 365.

Figure 5:
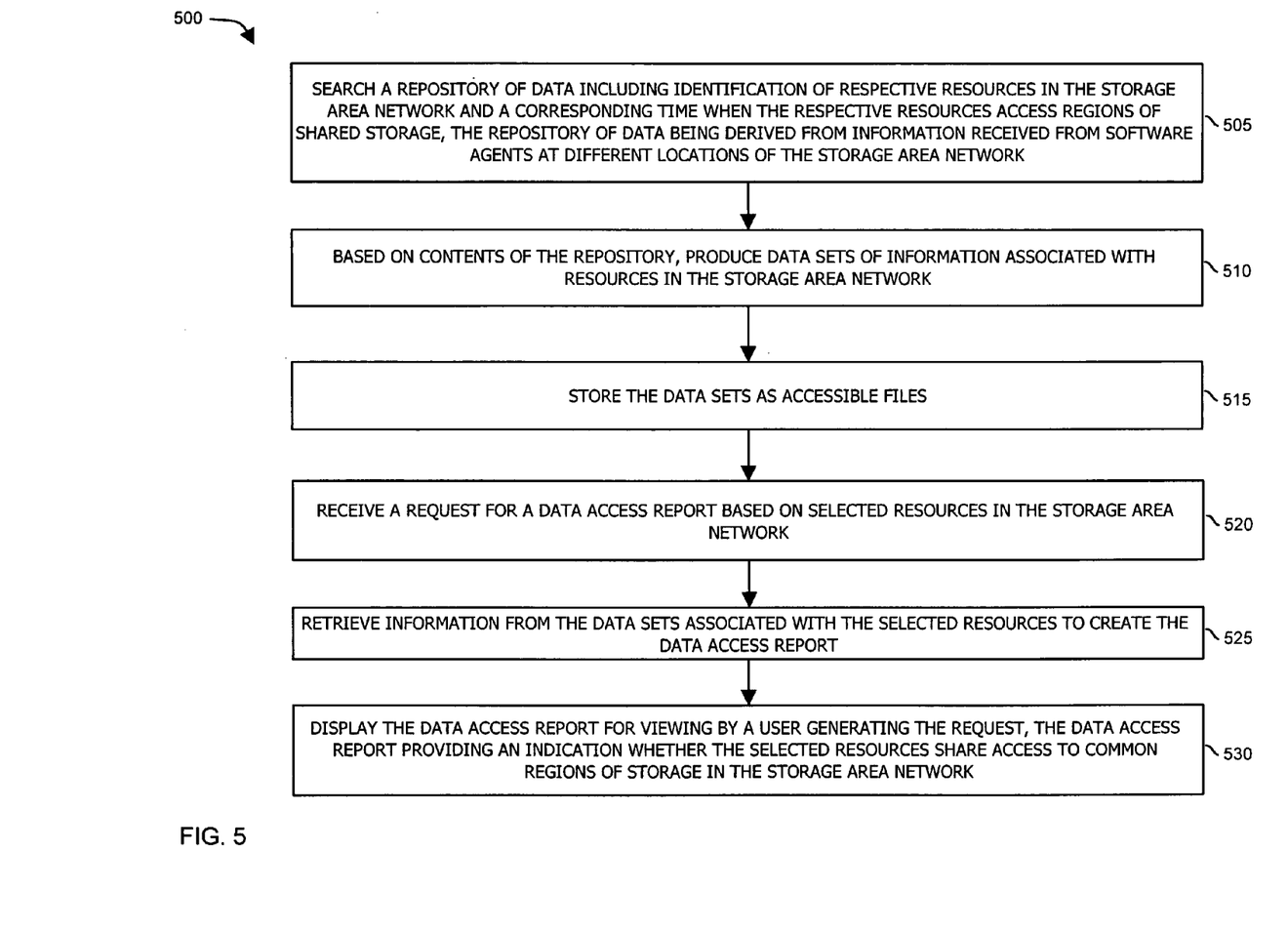
FIG. 5 is a flowchart of detecting existence of a cluster according to an embodiment of the invention.

FIG. 5 is a flowchart 500 illustrating processing steps performed by data parser 165 to generate data sets 170 as well as processing steps performed by management report generator 175 to identify existence of clusters in accordance with an embodiment of the invention.

In step 505, data parser 165 searches a repository of data (e.g., database 125) including identification of respective resources in the storage area network 300 and a corresponding time when the respective resources access regions of shared storage (i.e., storage system resources 375). As discussed, the repository of data is derived from information received from software agents 155 at different locations of storage area network 300.

In step 510, based on contents of the repository, the data parser 165 produces data sets 170 of information associated with resources in the storage area network 300.

In step 515, the data parser 165 stores the data sets 170 as accessible files (e.g., XML files).

In step 520, the management report generator 175 receives a request for a data access report 250 based on a selection of resources by a user at computer 112. In one embodiment, a user selects which resources in storage area network 300 shall be used to generate the report 250.

In step 525, the management report generator 175 retrieves information from the data sets 170 associated with the selected resources to create the report 250.

In step 530, the management report generator 175 transmits the report 250 to computer 112. Computer 112 displays the data access report 250 to user for viewing. As shown in FIG. 4, the data access report 250 provides an indication whether the user selected resources share access to common regions of storage in the storage area network 300. The report 250 may also indicate which resources in storage area network 300 are part of a cluster.

Functionality supported by computer system 110 according to embodiments of the invention will now be discussed with respect to flowchart 600 in FIG. 6 as discussed above.

Figure 6:
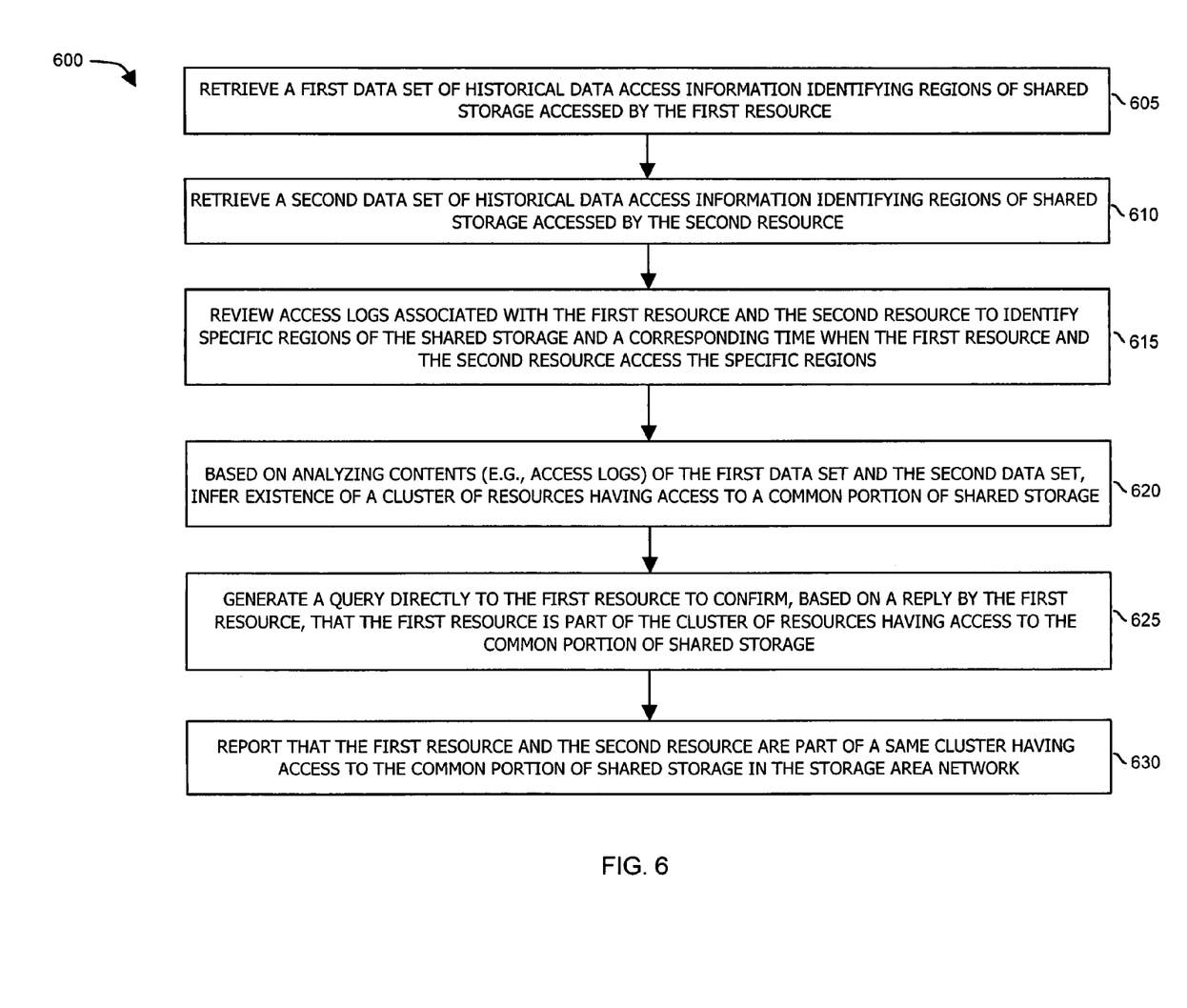
FIG. 6 is a flowchart of detecting existence of a cluster according to an embodiment of the invention.

FIG. 6 is a flowchart 600 of processing steps performed by management report generator 175 according to an embodiment of the invention. In general, flowchart 600 illustrates how management report generator 175 generates reports 250 and confirms existence of a cluster of resources. Note that the discussion of the flowchart 600 in FIG. 6 will include occasional references to techniques and features discussed in the previous figures.

In step 605, the management report generator 175 retrieves a first data set 170-1 of historical data access information identifying regions of shared storage accessed by a first resource.

In step 610, the management report generator 175 retrieves a second data set 170-2 of historical data access information identifying regions of shared storage accessed by the second resource. In one embodiment, the first resource and the second resource in the storage area network 300 are both host resources 301 in the storage area network 300 such as: an application, a file system, a volume group, and a volume, etc. that utilize storage resources in storage area network 300.

As mentioned above, a cluster of resources may include more than two members resources. For example, the cluster may include a third resource, fourth resource, etc., all of which access common portions of shared storage. To identify potential third, fourth, etc. members in a cluster, the management report generator, in addition to retrieving the first and second data sets, also retrieves respective third, fourth, etc. data sets for comparison to identify member resources in a cluster. In step 615, the management report generator 175 reviews access logs (i.e., historical data access information) associated with the first resource and the second resource (and potentially access logs or historical data associated with other resources) to identify specific regions of the shared storage and a corresponding time when the first resource and the second resource access the specific regions.

In step 620, based on analyzing contents (e.g., access logs) of the first data set 170-1 and the second data set 170-2 via use of the cluster detection function 240, the management report generator 175 infers existence of a cluster of resources having access to a common portion of shared storage.

In step 625, the management report generator 175 generates a query directly to the first resource or an associated cluster manager application to confirm, based on a reply by the first resource, that the first resource is part of the cluster of resources having access to the common portion of shared storage. Note that in another embodiment, a management application such as resource manager 120 associated with management report generator 175 generates a query directly to the first resource or an associated cluster manager application to confirm that the first resource is part of the cluster of resources having access to the common portion of shared storage.

In step 630, the management report generator 175 reports that the first resource and the second resource in storage area network 300 are part of a same cluster having access to the common portion of shared storage in the storage area network 300.

Figure 7:
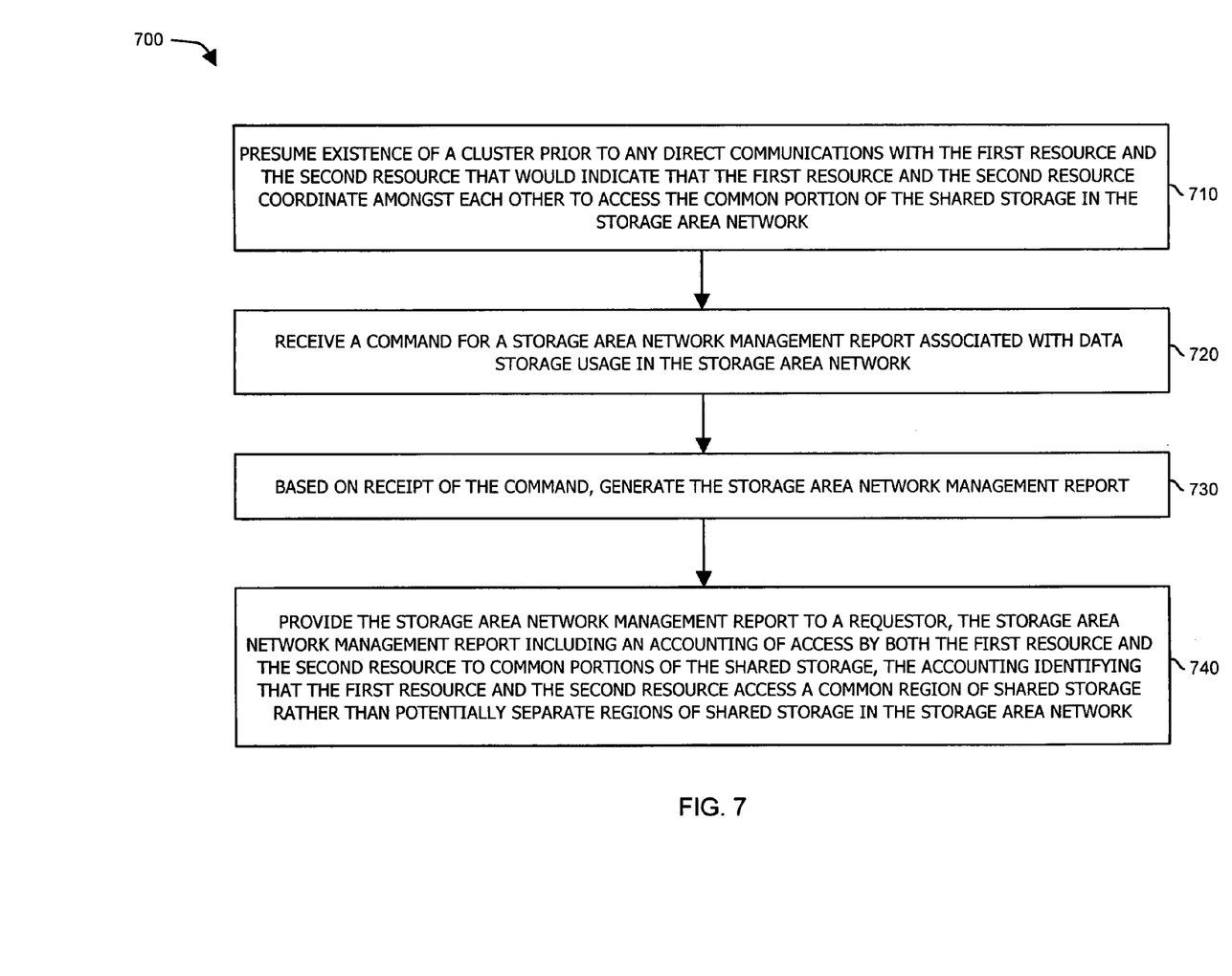
FIG. 7 is a flowchart illustrating a technique of receiving a command and serving a management report according to an embodiment of the invention.

FIG. 7 is a flowchart 700 of processing steps performed by management report generator 175 according to an embodiment of the invention. In general, flowchart 700 illustrates how management report generator 175 receives commands and, in response to the commands, generates reports 250 based on requests 210 from a user operating computer 112.

In step 710, the management report generator 175 presumes existence of a cluster prior to any direct communications with a first resource and a second resource that would indicate that the first resource and the second resource in storage area network 300 coordinate amongst each other to access the common portion of the shared storage in the storage area network 300.

In step 720, the management report generator 175 receive a command (report request 210) for a storage area network management report 250 associated with data storage usage in the storage area network 300.

In step 730, based on receipt of the command, the management report generator 175 generates the storage area network management report 250.

In step 740, the management report generator 175 provides the storage area network management report to a requestor at computer 112, the storage area network management report 250 including an accounting of access by both the first resource (e.g., host #1 in FIG. 4) and the second resource (e.g., host #4 in FIG. 4) to common portions of the shared storage, the accounting identifying that the first resource and the second resource access a common region of shared storage rather than potentially separate regions of shared storage in the storage area network 300.

Accordingly, based on inferring the existence of a cluster of resources, the management report generator 175 can alter a presentation of a shared data storage usage report 250 associated with the storage area network 300. Without use of the cluster detector function 240, the management report generator 175 would not be able to provide an indication whether the first resource and the second resource compete for use of or share access to common regions of shared storage in the storage area network 300.

Figure 8:
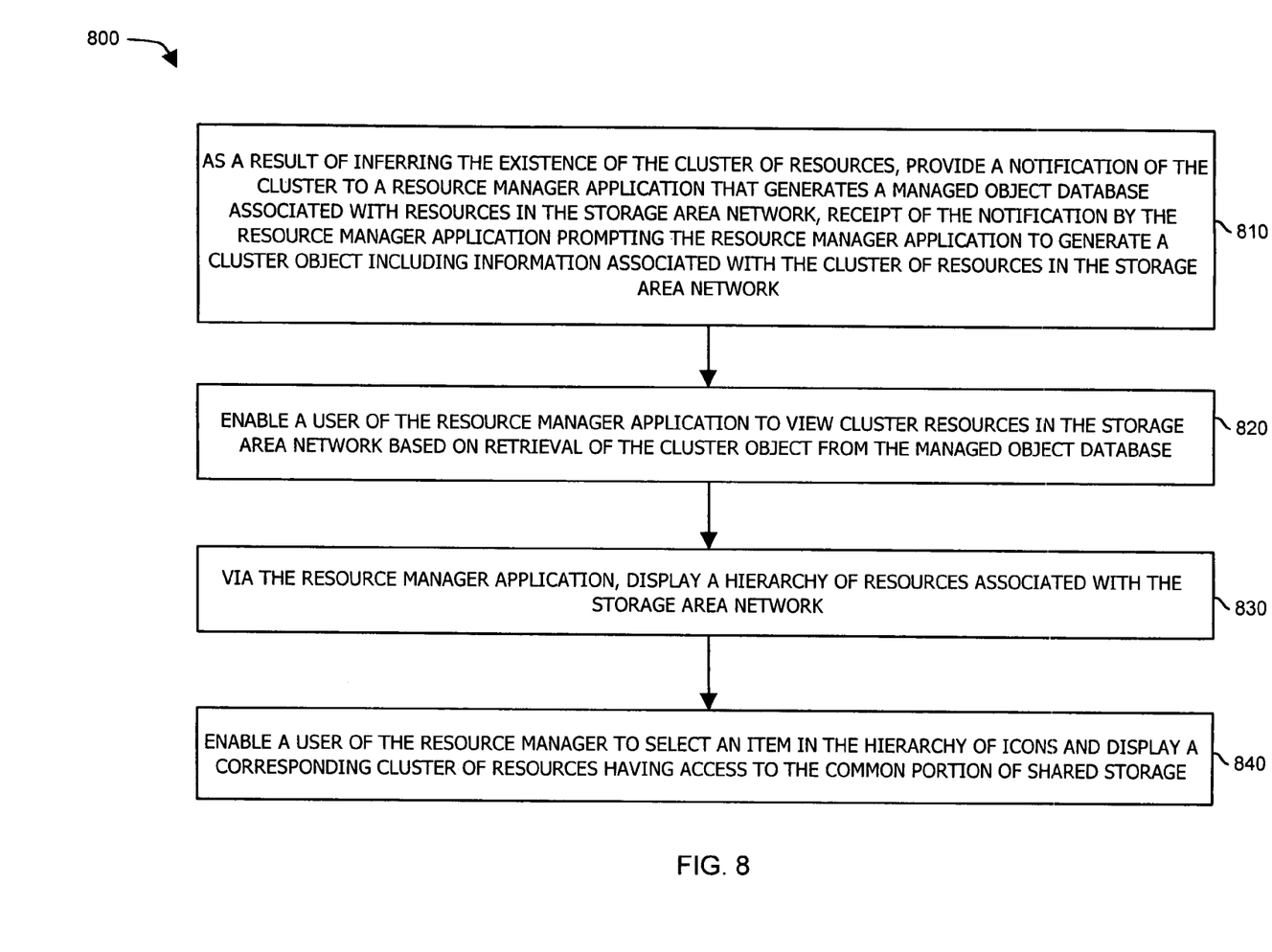
FIG. 8 is a flowchart illustrating a technique of generating a managed object associated with a newly detected cluster of resources according to an embodiment of the invention.

FIG. 8 is a flowchart 800 of processing steps performed by management report generator 175 and resource manager 120 according to an embodiment of the invention. In general, flowchart 800 illustrates how management report generator 175 notifies resource manager 120 of the existence of a cluster of resources and how resource manager 120 creates a cluster object associated with the inferred cluster of resources. In response to the commands (e.g., requests for management reports), the management report generator 175 generates reports 250.

In step 810, as a result of inferring the existence of the cluster of resources, the management report generator 175 provides a notification of the cluster to resource manager 120 that maintains a managed object database associated with resources in the storage area network 300. Receipt of the notification by the resource manager 120 prompts the resource manager 120 to generate a cluster object including information associated with the cluster of resources in the storage area network 300. For example, the resource manager 120 creates a name for a newly detected cluster and includes an identification of its member resources.

In step 820, the resource manager 120 enables a user of the resource manager application 120 at computer 110 to view cluster resources in the storage area network 300 based on retrieval of the cluster object from the managed object database 125.

In step 830, resource manager 120 displays a hierarchy of resources associated with the storage area network 300 for a user.

In step 840, the resource manager 120 enables a user of computer 110 to select an item in the hierarchy of icons and display a corresponding cluster of resources having access to the common portion of shared storage in the storage area network 300.

Figure 9:
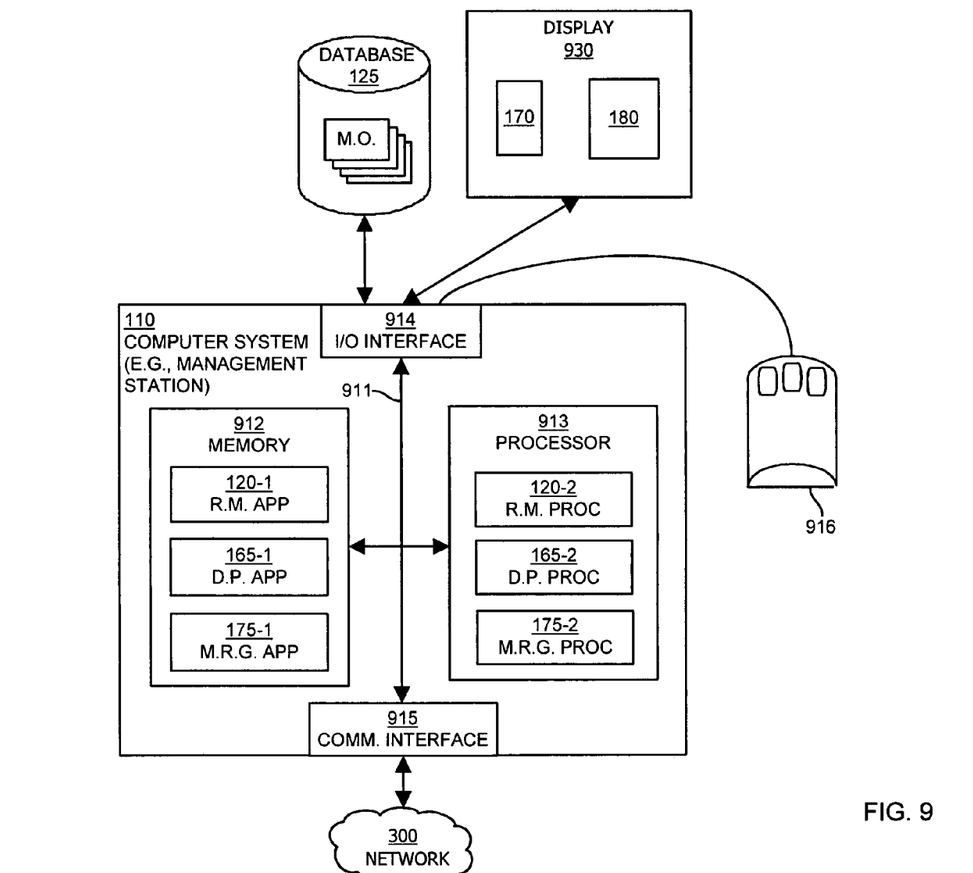
FIG. 9 is a block diagram of a processing device suited for executing techniques according to an embodiment of the invention

FIG. 9 is a block diagram illustrating an example architecture of computer 110 (e.g., a storage area network management station) according to embodiments of the invention. In one embodiment, computer 112 includes similar hardware as computer 110 and performs the functions as previously discussed. Computer system 110 may be a computerized device such as a personal computer, workstation, portable computing device, console, network terminal or the like.

As shown, computer system 110 of the present example includes an interconnect 911 that couples a memory 912, a processor 913, an input/output interface 914 and a communications interface 915. Peripheral device 916 (e.g., one or more viewer controlled devices such as a keyboard, mouse, etc.) couples to processor 913 through I/O interface 914 and enables a user to provide input commands and thus generally control display management functions associated with graphical user interface on display 930. As discussed, database 125 stores managed objects associated with managed entities (e.g., hardware and software entities associated with host resources 301, switch resources 302, storage resources 303, etc.) in network system 300. Communications interface 915 enables computer system 110 to communicate with other devices (i.e., resources) associated with network 300.

As shown, memory 912 is encoded with resource manager application 120-1 supporting generation, display, and implementation of functional operations of graphical user interface on display 930. Resource manager application 120-1 may be embodied as software code such as data and/or logic instructions (e.g., code stored in the memory or on another computer readable medium such as a disk) that supports processing functionality according to different embodiments of the invention as described herein. During operation, processor 913 accesses memory 912 via the interconnect 911 in order to launch, run, execute, interpret or otherwise perform the logic instructions of the resource manager application 120-1. Execution of resource manager application 120-1 produces processing functionality in resource manager process 120-2. In other words, the resource manager process 120-2 represents one or more portions of the resource manager application 120-1 (or the entire application 120-1) performing within or upon the processor 113 in the computerized device 110.

In a similar vein as discussed above for resource manager 120, computer 110 also includes a data parser application 165-1 and management resource application 175-1 that are stored as code in memory 912. Execution of data parser application 165-1 and management report generator application 175-1 produce respective processing functionality such as data parser process 165-2 and management report generator process 175-2. In other words, the D.P. (e.g., Data Parser) process 165-2 and M.R.G. (e.g., Management Report Generator) process represent respective one or more portions of the D.P. application 120-1 and M.R.G. application 175-1 performing within or upon the processor 913 in the computer 110.

It should also be noted that embodiments of the invention include the applications themselves (i.e., the un-executed or non-performing logic instructions and/or data). Such applications may be stored on a computer readable medium such as a floppy disk, hard disk or in an optical medium. The applications may also be stored in a memory type system such as in firmware, read only memory (ROM), or, as in this example, as executable code within the memory system 912 (e.g., within Random Access Memory or RAM). In addition to these embodiments, it should also be noted that other embodiments of the invention include the execution of applications in processor 913 as discussed. Thus, those skilled in the art will understand that the computer system 110 may include other processes and/or software and hardware components, such as an operating system that controls allocation and use of hardware resources.

A graphical user interface on display 930 configured in accordance with embodiments of the invention includes a hierarchical arrangement of icons 170 (e.g., a hierarchy of vertically disposed icons of resources associated with a storage area network 300). In general, icons in hierarchy 170 on display 930 represent managed hardware and software entities associated with network 300. Certain icons in the hierarchy of icons 170 correspond to "inferred" clusters existing storage area network 300. As discussed, the resource manager 120 enables a user of the computer 110 to select an icon (e.g., an icon associated with a cluster) from the hierarchy of icons 170 displayed on the left side of display 930 to display information 180 associated with a selected cluster on a right side of display 930. For example, based on selection of a cluster resource associated with storage area network 300, the resource manager 120 graphically displays (e.g., highlights) resources in a topology view (i.e., information 180) of the storage area network 300 to identify which resources in the storage area network 300 are associated with the cluster. Consequently, a user can view members of clusters associated with a storage area network 300 without a software process actually directly communicating with members of the cluster to confirm that the cluster exists. The members can be displayed along with other resources of storage area network 300 to show how they are interrelated or interconnected.

In summary, techniques of the invention are well suited for use in applications in which a software management application searches information in a database to infer the existence of a cluster of resources in a storage area network that share use of common storage resources. However, it should be noted that embodiments of the invention are not limited to use in such applications and thus embodiments of the invention are well suited for other applications as well.

While this invention has been particularly shown and described with references to preferred embodiments thereof, it will be understood by those skilled in the art that various changes in form and details may be made therein without departing from the spirit and scope of the invention as defined by the appended claims. Such variations are intended to be covered by the scope of this invention. As such, the foregoing description of embodiments of the invention is not intended to be limiting. Rather, any limitations to embodiments of the invention are presented in the following claims.

What is claimed is:

1. In a management application associated with a storage area network, a method comprising:
retrieving a first data set including historical data access information associated with a first resource in the storage area network, the historical data access information in the first data set identifying regions of shared storage accessed by the first resource;
retrieving a second data set including historical data access information associated with a second resource in the storage area network, the historical data access information in the second data set identifying regions of shared storage accessed by the second resource;
comparing the first data set and the second data set to identify a common portion of shared storage accessed by both the first resource and the second resource;
based on the comparing, inferring existence of a cluster of resources including at least the first resource and the second resource in the storage area network, the cluster of resources having access to the common portion of shared storage; and reporting the existence of the cluster of resources.

2. A method as in claim 1, wherein comparing the first data set and the second data set includes reviewing access logs associated with the first resource and the second resource to identify specific regions of the shared storage and a corresponding time when the first resource and the second resource access the specific regions.

3. A method as in claim 2 further comprising:

reporting that the first resource and the second resource are part of a same cluster having access to the common portion of shared storage in the storage area network.

4. A method as in claim 1, wherein inferring existence of the cluster of resources includes presuming existence of the cluster prior to any direct communications with the first resource and the second resource that would indicate that the first resource and the second resource coordinate amongst each other to access the common portion of the shared storage in the storage area network.

5. A method as in claim 4 further comprising:

receiving a command for a storage area network management report associated with data storage usage in the storage area network;

based on receipt of the command, generating the storage area network management report; and providing the storage area network management report to a requestor, the storage area network management report including an accounting of access by both the first resource and the second resource to common portions of the shared storage.

6. A method as in claim 5, wherein the accounting identifies that the first resource and the second resource access a common region of shared storage rather than potentially separate regions of shared storage in the storage area network.

7. A method as in claim 1 further comprising:

generating a query directly to a cluster application associated with the first resource to confirm, based on a reply by the cluster application, that the first resource is part of the cluster of resources having access to the common portion of shared storage.

8. A method as in claim 1 further comprising:

based on inferring the existence of the cluster of resources, altering a presentation of a shared data storage usage report associated with the storage area network, the report otherwise providing no indication whether the first resource and the second resource compete for access to common regions of shared storage in the storage area network.

9. A method as in claim 1, wherein the first resource and the second resource are both host resources in the storage area network pertaining to at least one of: an application, a file system, a volume group, and a volume.

10. A method as in claim 1 further comprising:

retrieving a third data set including historical data access information associated with a third resource in the storage area network, the historical data access information in the third data set identifying regions of shared storage accessed by the third resource;

retrieving a fourth data set including historical data access information associated with a fourth resource in the storage area network, the historical data access information in the fourth data set identifying regions of shared storage accessed by the fourth resource;

comparing the first data set, the second data set, the third data set, and the fourth data set to infer which of the first resource, the second resource, the third, and the fourth resource are part of a cluster having shared access to a common portion of shared storage accessed by the first resource and the second resource.

11. A method as in claim 1, wherein inferring existence of the cluster of resources includes identifying that each of the first resource and the second resource share access to an entire volume group created on multiple storage disks.

12. A method as in claim 1 further comprising:

as a result of inferring the existence of the cluster of resources, providing a notification of the cluster to a resource manager application that generates a managed object database associated with resources in the storage area network, receipt of the notification by the resource manager application prompting the resource manager application to generate a cluster object including information associated with the cluster of resources in the storage area network; and enabling a user of the resource manager application to view cluster resources in the storage area network based on retrieval of the cluster object from the managed object database.

13. A method as in claim 12, wherein the resource manager application displays a hierarchy of resources associated with the storage area network, the method further comprising:

enabling a user of the resource manager to select an item in the hierarchy of icons and display a corresponding cluster of resources having access to the common portion of shared storage.

14. A method as in claim 1, wherein inferring existence of a cluster of resources includes identifying that the first resource and the second resource are both host resources in the storage area network that access the shared storage of the storage area network through a switch resource.

15. A computer system associated with a storage area network, the computer system comprising:

a processor;

a memory unit that stores instructions associated with an application executed by the processor; and an interconnect coupling the processor and the memory unit, enabling the computer system to execute the application and perform operations of:

retrieving a first data set including historical data access information associated with a first resource in the storage area network, the historical data access information in the first data set identifying regions of shared storage accessed by the first resource;

retrieving a second data set including historical data access information associated with a second resource in the storage area network, the historical data access information in the second data set identifying regions of shared storage accessed by the second resource;

comparing the first data set and the second data set to identify a common portion of shared storage accessed by both the first resource and the second resource;

based on the comparing, inferring existence of a cluster of resources including at least the first resource and the second resource in the storage area network, the cluster of resources having access to the common portion of shared storage; and reporting the existence of the cluster of resources.

16. A computer system as in claim 15, wherein comparing the first data set and the second data set includes reviewing access logs associated with the first resource and the second resource to identify specific regions of the shared storage and a corresponding time when the first resource and the second resource access the specific regions.

17. A computer system as in claim 16 further supporting operations of:
reporting that the first resource and the second resource are part of a same cluster having access to the common portion of shared storage in the storage area network.

18. A computer system as in claim 15, wherein inferring existence of the cluster of resources includes presuming existence of the cluster prior to any direct communications with the first resource and the second resource that would indicate that the first resource and the second resource coordinate amongst each other to access the common portion of the shared storage in the storage area network.

19. A computer system as in claim 18 further supporting operations of:
receiving a command for a storage area network management report associated with data storage usage in the storage area network;
based on receipt of the command, generating the storage area network management report; and
providing the storage area network management report to a requester, the storage area network management report including an accounting of access by both the first resource and the second resource to common portions of the shared storage.

20. A computer system as in claim 19, wherein the accounting identifies that the first resource and the second resource access a common region of shared storage rather than potentially separate regions of shared storage in the storage area network.

21. A computer system as in claim 15 further supporting operations of:
generating a query directly to a cluster application associated with the first resource to confirm, based on a reply by the cluster application, that the first resource is part of the cluster of resources having access to the common portion of shared storage.

22. A computer system as in claim 15 further supporting operations of:
based on inferring the existence of the cluster of resources, altering a presentation of a shared data storage usage report associated with the storage area network, the report otherwise providing no indication whether the first resource and the second resource compete for access to common regions of shared storage in the storage area network.

23. A computer system as in claim 15, wherein the first resource and the second resource are both host resources in the storage area network pertaining to at least one of: an application, a file system, a volume group, and a volume.

24. A computer system as in claim 15 further supporting operations of:
retrieving a third data set including historical data access information associated with a third resource in the storage area network, the historical data access information in the third data set identifying regions of shared storage accessed by the third resource;
retrieving a fourth data set including historical data access information associated with a fourth resource in the storage area network, the historical data access information in the fourth data set identifying regions of shared storage accessed by the fourth resource;
comparing the first data set, the second data set, the third data set, and the fourth data set to infer which of the first resource, the second resource, the third, and the fourth resource are part of a cluster having shared access to a common portion of shared storage accessed by the first resource and the second resource.

25. A computer system as in claim 15, wherein inferring existence of the cluster of resources includes identifying that each of the first resource and the second resource share access to an entire volume group created on multiple storage disks.

26. A computer system as in claim 15 further supporting operations of:
as a result of inferring the existence of the cluster of resources, providing a notification of the cluster to a resource manager application that generates a managed object database associated with resources in the storage area network, receipt of the notification by the resource manager application prompting the resource manager application to generate a cluster object including information associated with the cluster of resources in the storage area network; and
enabling a user of the resource manager application to view cluster resources in the storage area network based on retrieval of the cluster object from the managed object database.

27. A computer system as in claim 26, wherein the resource manager application displays a hierarchy of resources associated with the storage area network, the method further comprising:
enabling a user of the resource manager to select an item in the hierarchy of icons and display a corresponding cluster of resources having access to the common portion of shared storage.

28. A computer system as in claim 15, wherein inferring existence of a cluster of resources includes identifying that the first resource and the second resource are both host resources in the storage area network that access the shared storage of the storage area network through a switch resource.

29. A computer program product including a computer-readable medium having instructions stored thereon for processing data information, such that the instructions, when carried out by a processing device, enable the processing device to perform the steps of:
retrieving a first data set including historical data access information associated with a first resource in the storage area network, the historical data access information in the first data set identifying regions of shared storage accessed by the first resource;
retrieving a second data set including historical data access information associated with a second resource in the storage area network, the historical data access information in the second data set identifying regions of shared storage accessed by the second resource;
comparing the first data set and the second data set to identify a common portion of shared storage accessed by both the first resource and the second resource;
based on the comparing, inferring existence of a cluster of resources including at least the first resource and the second resource in the storage area network, the cluster of resources having access to the common portion of shared storage; and
reporting the existence of the cluster of resources.

30. A computer system associated with a storage area network, the computer system providing:

means for retrieving a first data set including historical data access information associated with a first resource in the storage area network, the historical data access information in the first data set identifying regions of shared storage accessed by the first resource;

means for retrieving a second data set including historical data access information associated with a second resource in the storage area network, the historical data access information in the second data set identifying regions of shared storage accessed by the second resource;

means for comparing the first data set and the second data set to identify a common portion of shared storage accessed by both the first resource and the second resource;

means for inferring existence of a cluster of resources including at least the first resource and the second resource in the storage area network, the cluster of resources having access to the common portion of shared storage; and means for reporting the existence of the cluster of resources.

* * * * *